(No Model.)
T. B. SWAN.
HARROW.
No. 344,876.  Patented July 6, 1886.
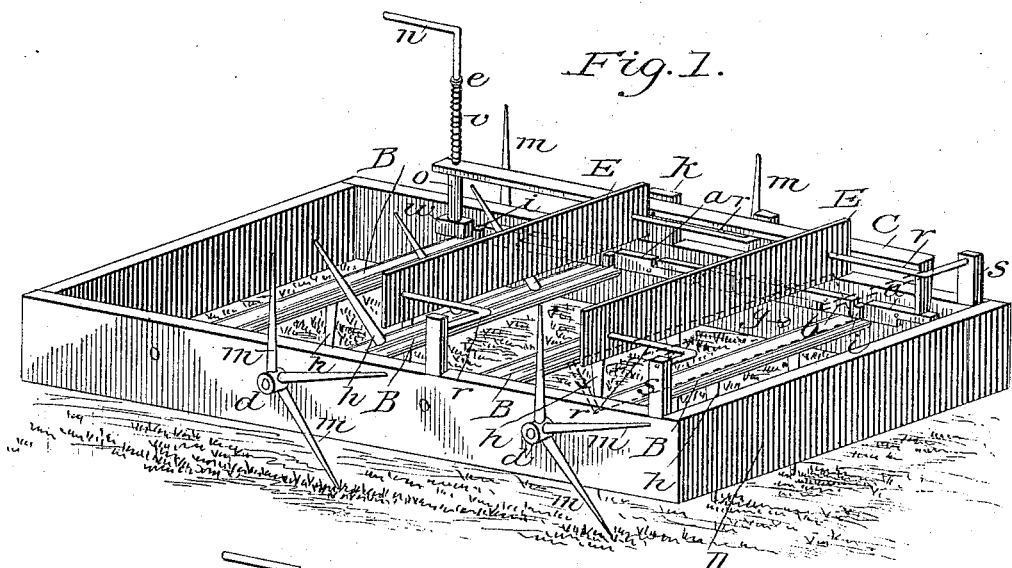
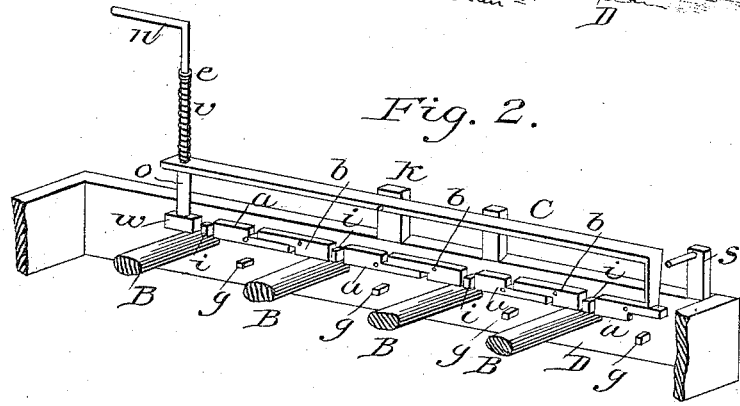
Witnesses.  Inventor.
Charles Meighan  T. Bryant Swan.
John H. Scott

UNITED STATES PATENT OFFICE.

T. BRYANT SWAN, OF ATLANTIC, IOWA, ASSIGNOR OF ONE-HALF TO EDMUND V. BURKE, OF SAME PLACE.

HARROW.

SPECIFICATION forming part of Letters Patent No. 344,876, dated July 6, 1886.

Application filed February 10, 1886. Serial No. 191,396. (No model.)

*To all whom it may concern:*

Be it known that I, T. BRYANT SWAN, a citizen of the United States, residing at the city of Atlantic, in the county of Cass and State of Iowa, have invented a new and useful Harrow, of which the following is a specification.

My invention relates to improvements in harrows having toothed rollers which rotate intermittingly.

The objects of my improvements are to provide a harrow that will clear itself of all clogs which come in contact with its teeth; also, a harrow that will do good work, even at the time it is clearing itself. I attain these objects by the mechanism illustrated in the accompanying drawings, in which—

Figure 1 is a perspective view of the harrow. Fig. 2 is a detailed view of one of the side pieces of the harrow with the catches and levers.

The frame D consists of two end and two side pieces properly secured to each other. The rollers B B B B are reduced at each end, forming a shoulder which rests against the inner surfaces of the side pieces of the frame D. The reduced portions of the rollers enter and pass through the side pieces of the frame in apertures made to receive them, and project outwardly beyond the side pieces of the frame. The apertures are made of suitable size to allow the easy rotation of the rollers. The pins *i i i i* are firmly secured to the rollers at a point where they will come in contact with the levers *b b b* and catches *a a a a*. To each roller are secured several tapering harrow-teeth, *h h h h*. Firmly secured to that reduced part of the rollers which projects outwardly beyond the side pieces of the harrow-frame are the rings *d d*, having screwed or secured to them one or more of the teeth or spikes, *m m*. These teeth should be at least as long as the harrow-teeth *h h h h*, and should be sufficient in number, in conjunction with the teeth *h h h h*, to cause the rollers to revolve when the harrow is moving forward, except when checked by the catches *a a a a*.

Pivoted to the side piece of the harrow-frame are the levers *b b b*, which rest at one end on the rollers and at the other end upon the catches *a a a a*. That portion of the lever between its pivot and the roller upon which it rests is made heavier than its other part.

Pivoted to the side piece of the harrow-frame are the catches *a a a a*, which rest at one end upon the rollers. The other end comes in contact with the under side of the levers *b b b*. That portion of the catch between its pivot and the roller upon which it rests is made heavier than its other part.

The support or standard *k* is secured to the side piece of the harrow-frame, and has pivoted to it the lever C, which bends downward at its forward end, coming in contact with the forward catch, *a*. Passing through an aperture made to receive it in the rear end of the lever C is the handle *n*. The aperture in the lever C is made of suitable size to allow the handle *n* to freely turn therein. The lower end of the handle *n* screws into an oblong piece of metal, *w*. Between this oblong piece *w* and the lever C is the sleeve *o*, which prevents the piece *w* and the lever C from approaching each other. The handle has the ledge *e*, between which and the lever C is the spring *v*. This spring holds the handle in its place and prevents it from turning too easily.

The pins *g g g g* are secured to the side piece of the harrow-frame, and are placed a short distance below the lighter end of each catch. While they allow the catches *a a a a* sufficient movement to clear the pins *i i i i*, they check a too free movement of the catches.

Secured to the sides of the harrow-frame are the standards *s s s s*. Pivoted to the standards are the arms *r r r r*, having firmly secured to them the tooth-scrapers E E. There can be a scraper for every roller, if desired. This system of levers, catches, and pins can be placed upon one or both sides of the harrow.

It is evident that when the harrow is moving forward, if the back end of the lever C be elevated, it will move the heavier part of the forward catch *a* upward, so that the pin *i* can move under the catch, and thus release the front roller, which, being actuated by the teeth *m m* and front harrow-teeth, will rotate, causing the front pin *i* to come in contact with the under side of the front lever *b*. The pin will force upward the heavier part of the lever, which will cause the heavier part of the next backward catch to rise and release the roller upon which it rests. The forward pin *i*, after moving the lever, comes in contact with the front catch, *a*, which checks the rotation of the roller. In this manner all the rollers are released and checked until the back roller revolves, when the rear pin $i$ comes in contact with the under side of the piece $w$, forcing it, with the handle $n$ and the back end of the lever C, upward. At the same time the front end of the lever C descends and moves the forward catch $a$ and releases the front roller. Thus while one roller is revolving the rotation of the remainder is suspended. The handle $n$ can be turned and the piece $w$ moved out of the reach of the backward pin $i$, and the revolution of all the rollers suspended as long as desired. If any clogs come in contact with the teeth of the harrow, the rotation of the rollers allows the harrow to pass over and leave them behind, and while one roller is revolving and clearing itself of obstructions the remainder are doing good service harrowing. If any obstruction becomes stuck to the teeth of the harrow, it will be removed by the scrapers E E.

When the roller revolves, the harrow-teeth pass under the scraper, forcing it upward, and while it is being moved upward it scrapes the harrow-teeth from near their base to their points, and then falls back upon the roller.

Having described my invention, what I claim as new, and desire to secure by Letters Patent, is—

1. The combination, in a harrow, of the frame D, having pivoted to its sides the catches $a$ and levers $b$, the rollers B, having the pins $i$ and teeth $h$, the ring $d$, having the teeth $m$, the lever C, having passing loosely through an aperture in its rear end the handle $n$, the piece $w$, secured to the lower end of the handle $n$, all constructed and arranged substantially as shown and described.

2. The combination, in a harrow, of the frame D, having pivoted to it the catches $a$ and levers $b$, with the lever C, the handle $n$, the piece $w$, the rollers B, having the pins $i$ and teeth $h$, the rings $d$, having the teeth $m$, the scrapers E, and arms $r$, substantially as described.

T. BRYANT SWAN.

Witnesses:
JOHN H. SCOTT,
JOSEPH BENTON ROCKAFELLOW.